United States Patent
Kim et al.

(10) Patent No.: US 9,893,789 B2
(45) Date of Patent: Feb. 13, 2018

(54) METHOD OF TRANSMITTING A REFERENCE SIGNAL IN A WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/302,875

(22) PCT Filed: Feb. 12, 2015

(86) PCT No.: PCT/KR2015/001427
§ 371 (c)(1),
(2) Date: Oct. 7, 2016

(87) PCT Pub. No.: WO2015/156491
PCT Pub. Date: Oct. 15, 2015

(65) Prior Publication Data
US 2017/0033853 A1    Feb. 2, 2017

Related U.S. Application Data

(60) Provisional application No. 61/977,644, filed on Apr. 10, 2014.

(51) Int. Cl.
*H04L 1/02* (2006.01)
*H04B 7/06* (2006.01)
(Continued)

(52) U.S. Cl.
CPC ......... *H04B 7/0617* (2013.01); *H04B 7/0417* (2013.01); *H04B 7/0452* (2013.01)

(58) Field of Classification Search
CPC ....... H04L 1/0618; H04L 1/06; H04B 7/0408; H04B 7/0417; H04B 7/0617; H04B 7/0695
(Continued)

(56) References Cited

U.S. PATENT DOCUMENTS

2013/0039445 A1    2/2013   Hwang
2013/0242773 A1    9/2013   Wernersson et al.
(Continued)

OTHER PUBLICATIONS

PCT International Application No. PCT/KR2015/001427, Written Opinion of the International Searching Authority dated May 19, 2015, 10 pages.

*Primary Examiner* — Khai Tran
(74) *Attorney, Agent, or Firm* — Lee Hong Degerman Kang & Waimey

(57) ABSTRACT

A method of transmitting a reference signal for a hybrid beamforming in a base station of a wireless communication system according to one embodiment of the present invention may include selecting first subset elements arrayed in a first direction from a plurality of antenna elements included in a 2D array antenna of the base station and transmitting a first reference signal through a reference beam formed by the first subset elements, wherein a first cross-section for the first direction of the reference beam corresponds to a directional beam and wherein a second cross-section for a second direction crossing the first direction of the reference beam corresponds to an omni-directional beam.

16 Claims, 11 Drawing Sheets

(51) Int. Cl.
*H04B 7/0417* (2017.01)
*H04B 7/0452* (2017.01)

(58) Field of Classification Search
USPC ........ 375/267, 360, 285, 296; 342/368, 375; 455/63.4, 114.3, 69
See application file for complete search history.

(56) References Cited

U.S. PATENT DOCUMENTS

| | | |
|---|---|---|
| 2013/0308714 A1 | 11/2013 | Xu_ et al. |
| 2013/0308715 A1 | 11/2013 | Nam et al. |
| 2014/0016549 A1 | 1/2014 | Novlan et al. |
| 2015/0365908 A1* | 12/2015 | Maltsev .............. H04W 52/267 455/522 |
| 2016/0226640 A1* | 8/2016 | Seol ........................ H04B 7/26 |
| 2017/0078001 A1* | 3/2017 | Kim ..................... H04B 7/0626 |

* cited by examiner

METHOD OF TRANSMITTING A REFERENCE SIGNAL IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/001427, filed on Feb. 12, 2015, which claims the benefit of U.S. Provisional Application No. 61/977,644, filed on Apr. 10, 2014, the contents of which are all hereby incorporated by reference herein in their entirety.

TECHNICAL FIELD

The present invention relates to a method of transmitting a reference signal for performing a beamforming in a wireless communication system and apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

Technical Task

The technical task of the present invention is to provide a method of efficiently transmitting a reference signal for a beamforming in a wireless communication system and a method of performing a hybrid beamforming based on a feedback for the reference signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting a reference signal for a hybrid beamforming in a base station of a wireless communication system according to one embodiment of the present invention may include selecting first subset elements arrayed in a first direction from a plurality of antenna elements included in a 2D array antenna of the base station and transmitting a first reference signal through a reference beam formed by the first subset elements, wherein a first cross-section for the first direction of the reference beam corresponds to a directional beam and wherein a second cross-section for a second direction crossing the first direction of the reference beam corresponds to an omni-directional beam.

To further achieve these and other advantages and in accordance with the purpose of the present invention, as embodied and broadly described, in transmitting a reference signal for a hybrid beamforming in a wireless communication system, a base station according to another embodiment of the present invention may include a processor selecting first subset elements arrayed in a first direction from a plurality of antenna elements included in a 2D array antenna of the base station and a transmitter transmitting a first reference signal through a reference beam formed by the first subset elements, wherein a first cross-section for the first direction of the reference beam corresponds to a directional beam and wherein a second cross-section for a second direction crossing the first direction of the reference beam corresponds to an omni-directional beam.

To further achieve these and other advantages and in accordance with the purpose of the present invention, as embodied and broadly described, a method of receiving a reference signal for a hybrid beamforming in a user equipment of a wireless communication system according to further embodiment of the present invention may include receiving a first reference signal through first subset elements arrayed in a first direction among a plurality of antenna elements included in a 2D array antenna of a base station and measuring a gain of a reference beam formed by the first subset elements based on the received first reference signal, wherein a first cross-section for the first direction of the reference beam corresponds to a directional beam and wherein a second cross-section for a second direction crossing the first direction of the reference beam corresponds to an omni-directional beam.

To further achieve these and other advantages and in accordance with the purpose of the present invention, as embodied and broadly described, in receiving a reference signal for a hybrid beamforming in a wireless communication system, a user equipment according to another further embodiment of the present invention may include a receiver receiving a first reference signal through first subset elements arrayed in a first direction among a plurality of antenna elements included in a 2D array antenna of a base station and a processor measuring a gain of a reference beam formed by the first subset elements based on the received first reference signal, wherein a first cross-section for the first direction of the reference beam corresponds to a directional beam and wherein a second cross-section for a second direction crossing the first direction of the reference beam corresponds to an omni-directional beam.

Preferably, the base station may transmit a second reference signal through an analog beam formed through either the first subset elements or second subset elements and may receive a channel state information (CSI) including a gain difference between the reference beam and the analog beam. The base station may perform a hybrid beamforming in which an analog beamforming and a digital beamforming are coupled based on the CSI, and a PMI of the digital beamforming may be determined based on the gain difference between the reference beam and the analog beam. More preferably, the analog beam may indicate an angle range for performing the hybrid beamforming along the second direction.

Preferably, the base station may form a first reference beam through the first subset elements and may form a second reference beam by steering the first reference beam along the first direction.

Moreover, the second reference beam may be formed by the first subset elements or second subset elements arrayed in the first direction. In this case, a precoding matrix (PMI) of the second reference beam may be different from that of the first reference beam.

Preferably, one of the first direction and the second direction may be a horizontal direction and the other may be a vertical direction.

Advantageous Effects

According to an embodiment of the present invention, a reference signal for a beamforming can be efficiently transmitted through a 2D array antenna.

Effects obtainable from the present invention may be non-limited by the above mentioned effect. And, other unmentioned effects can be clearly understood from the following description by those having ordinary skill in the technical field to which the present invention pertains.

MODE FOR INVENTION

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
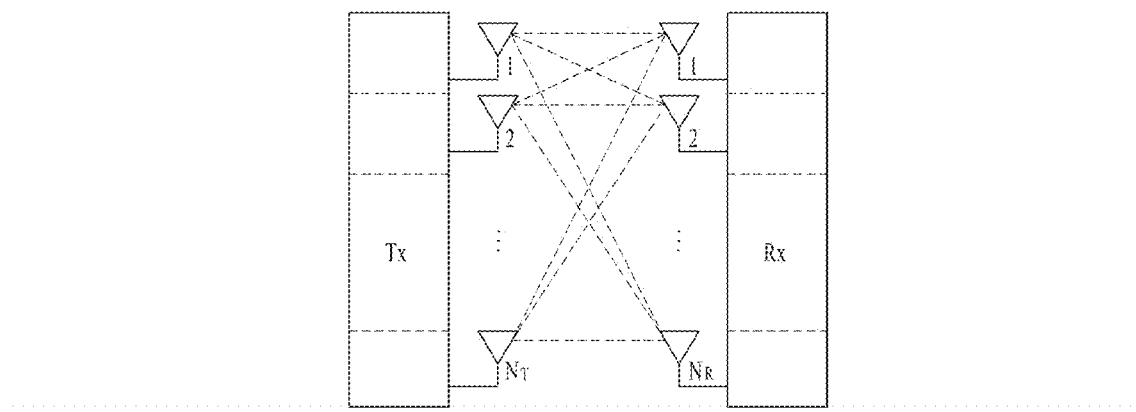
FIG. 1 is a diagram of a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$ as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist.

Hence, the transmission information may be represented by the vector shown in Formula 2.

$$s=[s_1,s_2,\ldots,s_{N_T}]^T \quad \text{[Formula 2]}$$

Meanwhile, transmission powers can be set different from each other for transmission informations $s_1$, $s_2$, ..., $s_{N_T}$, respectively. If the transmission powers are set to $P_1$, $P_2$, ..., $P_{N_T}$, respectively, the transmission power adjusted transmission information can be represented as Formula 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Formula 3]}$$

And, Ŝ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector Ŝ. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of stream} \leq \text{rank}(H) \leq \min(H) \leq \min(N_T, N_R) \quad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
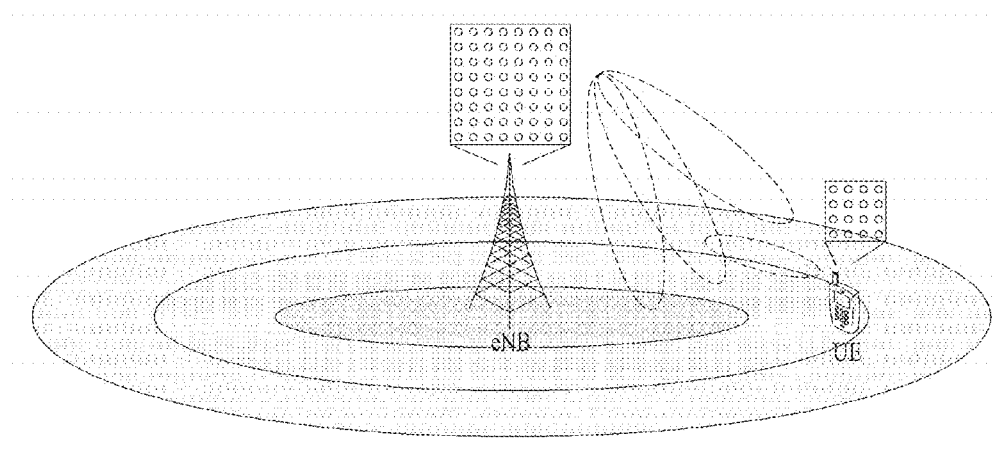
FIG. 2 is a diagram of a massive MIMO environment.

FIG. 2 shows one embodiment of a massive MIMO environment. Particularly, FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
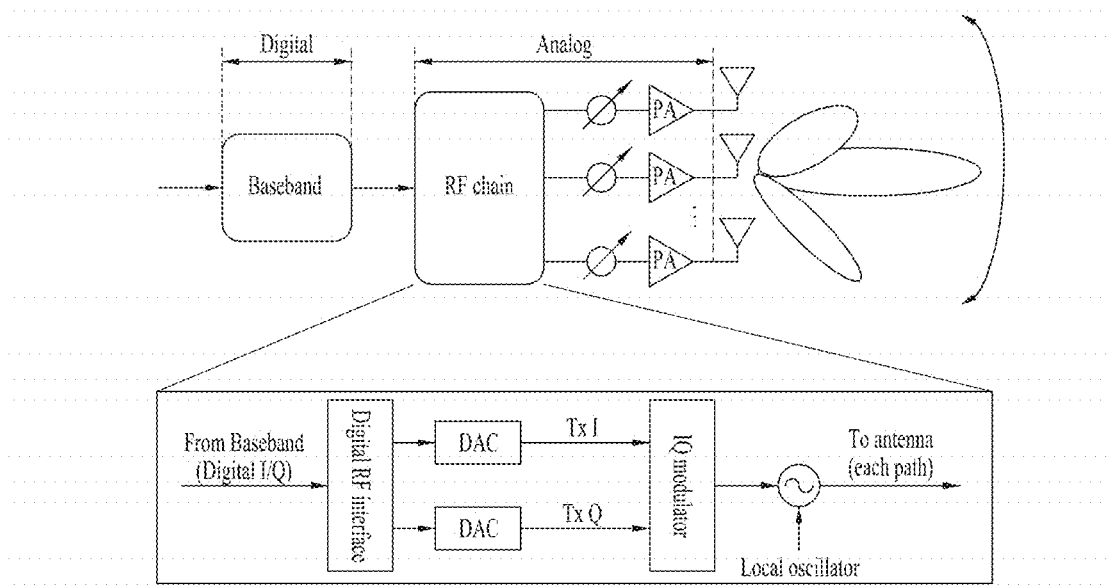
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
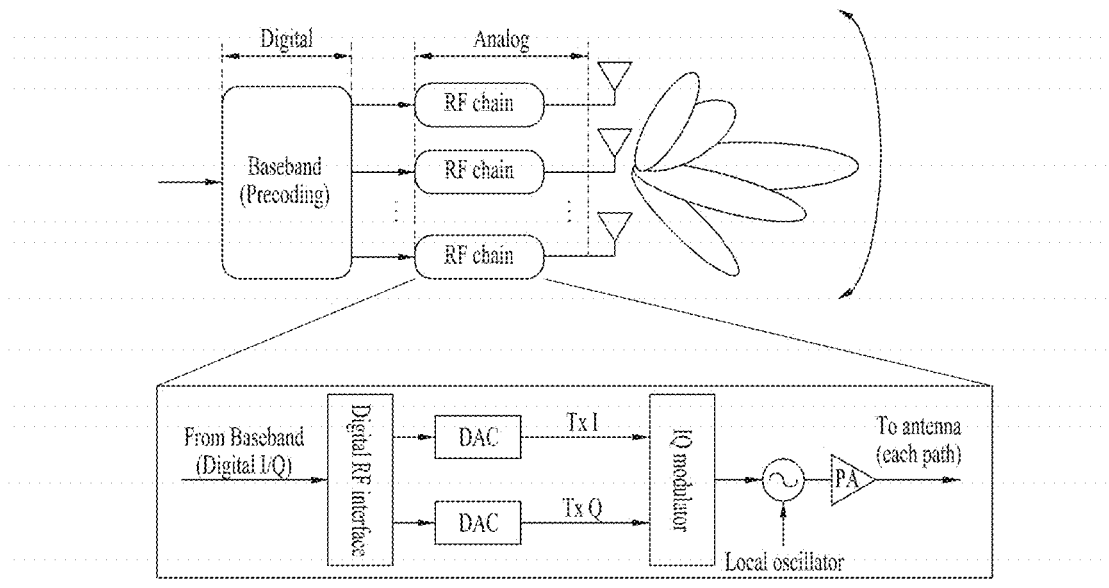
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
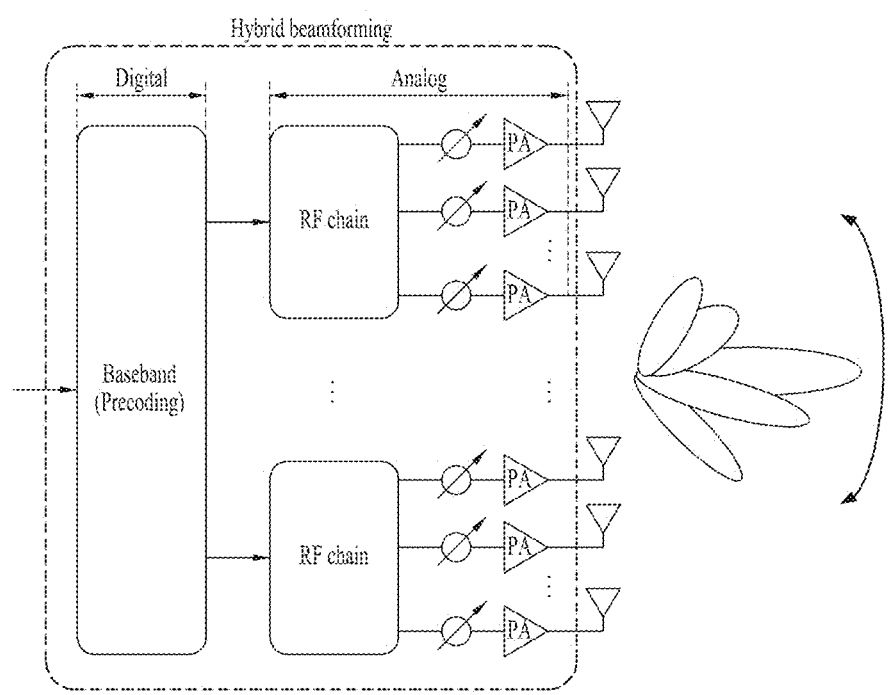
FIG. 5 is a diagram to describe the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of beams in all user equipment direction at the same time. Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

TABLE 1

|  | Beamforming accuracy control facilitation | Multicarrier beam control | Multi-stream transmission | Hardware complexity (BB process) | Pilot and feedback overhead |
| --- | --- | --- | --- | --- | --- |
| Analog beamforming scheme | Low (PA/PS device characteristics and relation) | Impossible or difficult | Impossible or difficult | Low | Low |
| Digital beamforming scheme | High | Possible | Possible | High | High |

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hybrid beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hybrid beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
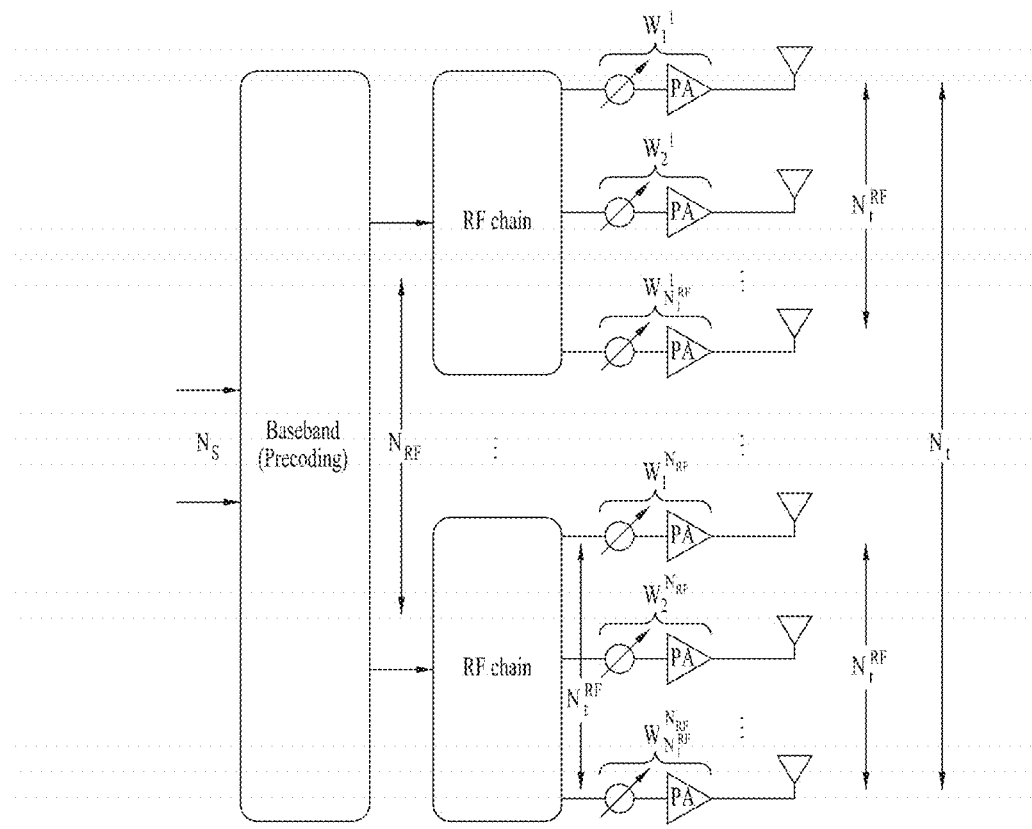
FIG. 6 is a diagram of a structure of a transmitting stage for performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number $N_{RF}$ and the per-RF chain antenna number $N_t^{RF}$. Since a signal having passed through a phase shifter and a power amplifier per RF chain is sent to a transmitting antenna, a system model can be defined as Formula 8.

$$y_k = H_k F^{RF} F_k^{BB} s_k + z_k \quad \text{[Formula 8]}$$

In Formula 8, the k indicates a subcarrier index. The subcarrier index k has a value ranging 0 to ($N_{FFT}-1$). The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_S$' in the subcarrier k. And, the baseband precoder (digital beamforming) may be individually configured per subcarrier. The $s_k$ indicates a transmitted signal vector having a size of '$N_S \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_S$ indicates the number of transmitted data streams.

Each term in Formula 8 is represented in detail as Formula 9.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} F^{RF} \quad \text{[Formula 9]}$$

$$\left( \begin{bmatrix} v_{1,1} & v_{1,2} & \cdots & v_{N_{RF}, N_S} \\ v_{2,1} & v_{2,2} & \cdots & v_{N_{RF}, N_S} \\ \vdots & \vdots & \ddots & \vdots \\ v_{N_{RF}, 1} & v_{N_{RF}, 2} & \cdots & v_{N_{RF}, N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(N_r)} \end{bmatrix}$$

The '$N_t \times N_{RF}$' precoding matrix $F^{RF}$ of an analog beamforming performed after an RF chain by a phase shifter and a power amplifier can be expressed as Formula 10 in the following.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \quad \text{[Formula 10]}$$

Moreover, a vector indicating a weight for each of t antennas belonging to an RF chain I in the precoding matrix $F^{RF}$ can be defined as Formula 11 in the following.

$$w_{N_t^{RF}}^j = \begin{bmatrix} w_1^j \\ w_2^j \\ \vdots \\ w_{N_t^{RF}}^j \end{bmatrix} \quad \text{[Formula 11]}$$

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of antenna elements are linearly arrayed in a manner of being spaced apart from each other by an equal space d.

An array response vector of the ULA antenna is expressed as Formula 12 in the following.

$$a(\theta) = \left[1 \quad \exp\left(j2\pi \times 1 \times \frac{d}{\lambda}\sin(\theta)\right) \quad \exp\left(j2\pi \times 2 \times \frac{d}{\lambda}\sin(\theta)\right) \quad \ldots \quad \exp\left(j2\pi \times (N_t - 1) \times \frac{d}{\lambda}\sin(\theta)\right)\right]^T$$

[Formula 12]

In Formula 12, the $\lambda$ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
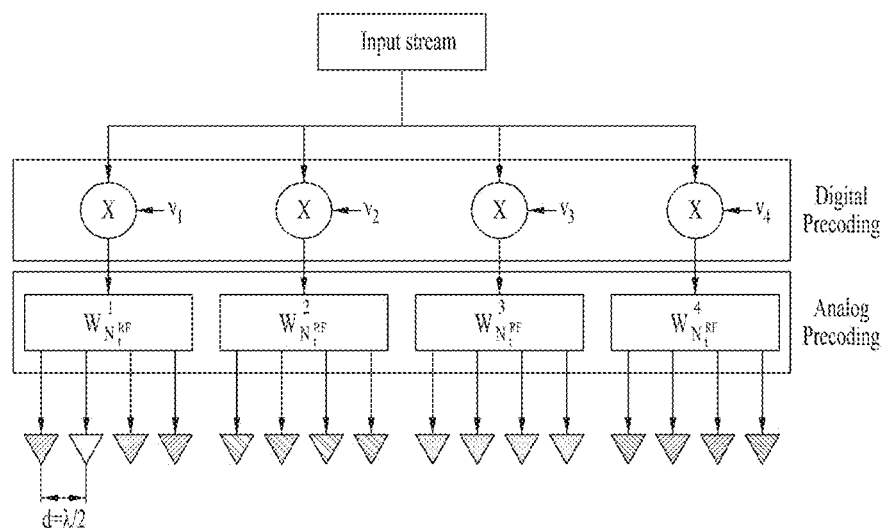
FIG. 7 is a diagram of 16-ULA antenna structure configured with 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is $d=\lambda/2$. According to the example shown in FIG. 7, a precoding matrix for an analog beamforming is defined as Formula 13.

$$F^{RF} = \begin{bmatrix} w_{N_t^{RF}}^1 & 0 & 0 & 0 \\ 0 & w_{N_t^{RF}}^2 & 0 & 0 \\ 0 & 0 & w_{N_t^{RF}}^3 & 0 \\ 0 & 0 & 0 & w_{N_t^{RF}}^4 \end{bmatrix},$$

[Formula 13]

$$w_{N_t^{RF}}^j = \begin{bmatrix} w_1^j \\ w_2^j \\ w_3^j \\ w_4^j \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Formula 14 in the following. For clarity, a rank 1 is assumed, by which the present invention is non-limited.

$$F^{BB} = v_1 = [v_1 v_2 v_3 v_4]^T \quad [\text{Formula 14}]$$

A antenna array response vector to which the digital beamforming of Formula 14 is applied at the boresight ($\theta=0°$) can be represented as Formula 15. In this case, an inter-antenna distance d is assumed as $\lambda/2$.

$$\sum a(\theta) = \sum_{i=0}^{15} a_i(\theta) = (1 + \exp(j\pi \times \sin(\theta)) + \exp(j\pi 2 \times \sin(\theta)) +$$

[Formula 15]

-continued $$\exp(j\pi 3 \times \sin(\theta))) \times v_1 +$$
$$(\exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(\exp(j\pi 8 \times \sin(\theta)) + \exp(j\pi 9 \times \sin(\theta)) +$$
$$\exp(j\pi 10 \times \sin(\theta)) + \exp(j\pi 11 \times \sin(\theta))) \times v_3 +$$

-continued
$$(\exp(j\pi 12 \times \sin(\theta)) + \exp(j\pi 13 \times \sin(\theta)) +$$
$$\exp(j\pi 14 \times \sin(\theta)) + \exp(j\pi 15 \times \sin(\theta))) \times v_4$$

Formula 15 can be summarized into Formula 16.

$$\sum a(\theta) = (1 + \exp(j\pi \times \sin(\theta)) + \exp(j\pi 2 \times \sin(\theta)) + \exp(j\pi 3 \times \sin(\theta))) \times$$
$$(v_1 + \exp(j\pi 4\sin(\theta)) \cdot v_2 + \exp(j\pi 8\sin(\theta)) \cdot v_3 +$$
$$\exp(j\pi 12\sin(\theta)) \cdot v_4) =$$
$$\left(\sum_{i=1}^{4} s_i\right) \times \left(\sum_{i=1}^{4} t_i\right) = \sum s \sum t$$

[Formula 16]

The s in Formula 16 is expressed as Formula 17 and shall be named a beam bound vector. And, the t in Formula 16 is expressed as Formula 18 and shall be named a beam gain and steering vector or a beam steering vector.

$$s = \begin{bmatrix} 1 \\ e^{j\pi\sin(\theta)} \\ e^{j\pi 2\sin(\theta)} \\ e^{j\pi 3\sin(\theta)} \end{bmatrix}$$

[Formula 17]

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix}$$

[Formula 18]

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
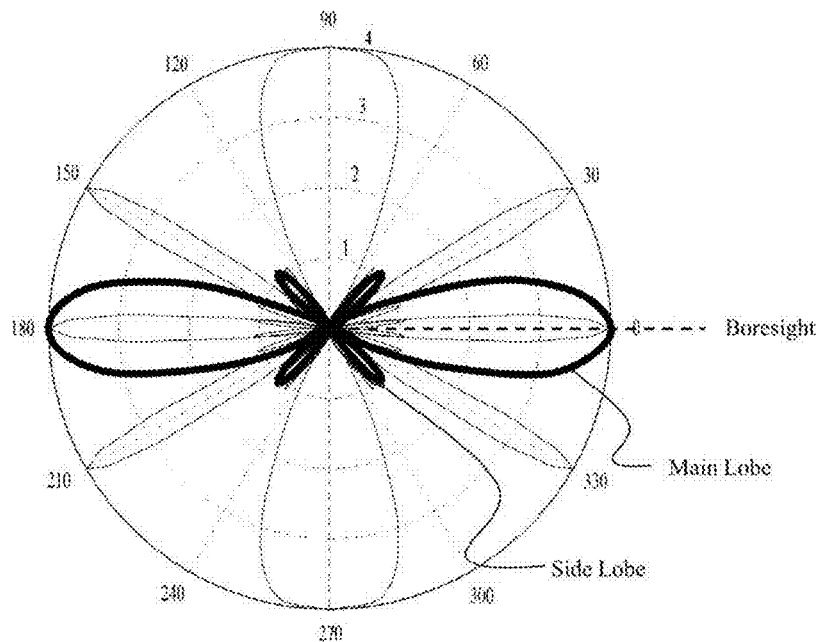
FIG. 8 is a diagram of beam patterns by a beam bound vector and a beam steering vector.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t=16$, $N_t^{RF}=4$, $N_{RF}=4$ are assumed. A beam pattern of a beam bund vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
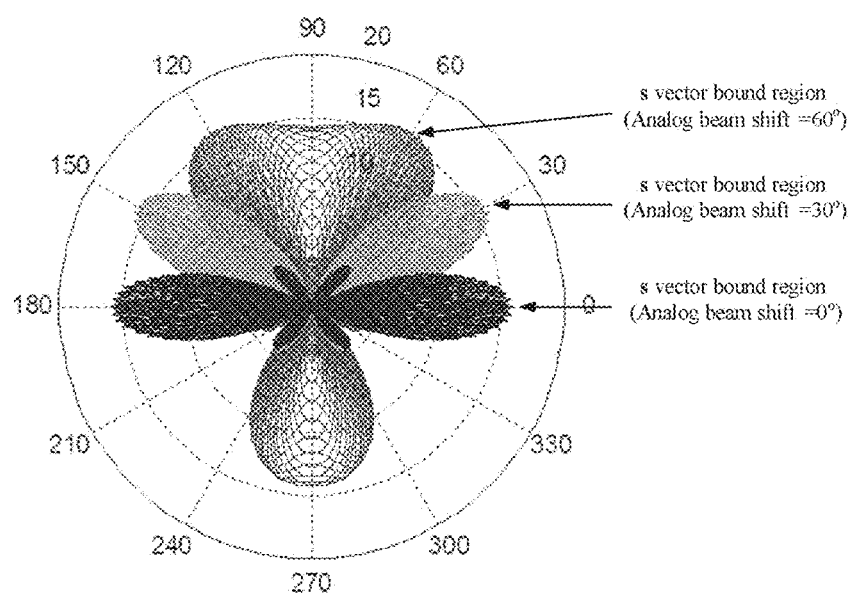
FIG. 9 is a diagram of a beam pattern of a final antenna array response vector in response to an analog beam transition according to one embodiment of the present invention.

FIG. 9 shows an antenna array response when a steering angle of an analog beam is shifted at 0 degree, 30 degrees, or 60 degrees. In FIG. 8, it is assumed that $N_t=16$, $N_t^{RF}=4$, $N_{RF}=4$. And, a result from applying digital $v_1=[v_1\ v_2\ v_3\ v_4]$ is shown in FIG. 9. As mentioned in the foregoing descriptions with reference to FIG. 8 and FIG. 9, a range of a valid beam is limited by the vector s.

Reference Beam

Figure 10:
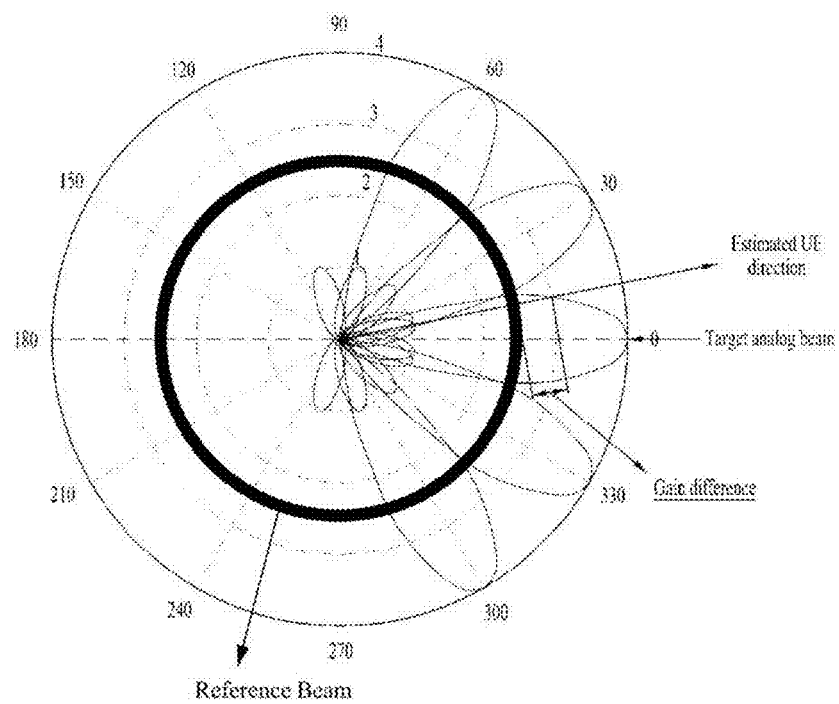
FIG. 10 is a diagram for one example of a method of calculating a gain difference between a reference beam and a bounded beam according to one embodiment of the present invention.

According to one embodiment of the present embodiment, a reference beam is proposed. A reference beam, as shown in FIG. 10, can be designed to have the same beam gain in omni-directions. For instance, a base station can form a reference beam through an omni-directional antenna. According to another embodiment, a base station is able to from an omni-directional beam having a beam gain of 0 dB using a single antennal. According to further embodiment of the present embodiment, a base station is able to generate a directional beam using multiple antennas and is also able to form an omni-directional beam approximately for a prescribed area.

A base station is able to periodically transmit a reference beam. And, a transmission period of the reference beam may be set for a user equipment by RRC signaling or may be broadcasted as a portion of system information. A reference beam may be generated based on a reference signal, by which the present invention is non-limited.

In case of ignoring an environment that causes interference, noise, propagation hindrance from neighbor cells or other user equipments, a gain of a reference beam is identical for all steering angles. For all directions having the same straight-line distance between a base station and a user equipment, gains of a reference beam are equal to each other. A transmission power of a base station for forming a reference beam is uniformly fixed or may be fixed to a cell-specific value. A gain of a reference beam may vary depending on a distance from a base station. In particular, the farther a distance from a base station gets, the less a gain of a reference beam becomes. Hence, a gain of a reference beam may be used as an index for a straight-line distance between a base station and a user equipment.

Gain Difference Between Reference Beam and Bounded Beam

As mentioned in the foregoing description, although a digital beamforming is performed in all directions by fixing a direction of an analog beamforming (e.g., $F^{RF}$ fixed), a range of a formable hybrid beam is limited to a range within a beam bound vector. Hereinafter, a beam of a beam bound vector shall be named a bounded beam. Since a digital beamforming component is excluded from a bounded beam, a bounded beam in a hybrid beamforming can be formed through an equivalent analog beamforming.

According to one embodiment of the present embodiment, through a difference between a gain of a reference beam measured by a user equipment and a gain of a bounded beam measured by the user equipment, a user equipment located direction from a base station can be estimated. For instance, a base station forms bounded beams ($F_{RF}=0°\pm30°$, $\pm60°$) through an analog beamforming. In this case, the steering angles of the bounded beams can be changed variously. In case of increasing resolution, a beamforming may be performed by a unit smaller than 30.

A base station forms bounded beams sequentially for respective steering angles or may be able to form bounded beams in multiple directions through different analog devices simultaneously. For instance, a specific timing and angle for a base station to form a bounded beam are previously defined, broadcasted through a system information, or set at a user equipment through RRC signaling.

FIG. 10 is a diagram for one example of a method of calculating a gain difference between a reference beam and a bounded beam according to one embodiment of the present invention. Referring to FIG. 10, a user equipment (UE) is located on a straight line in an estimated UE direction. A gain (Gref) of a reference beam appears at a point where a straight line indicating a UE located direction and a circle indicating the reference beam cross each other. Similarly, a gain (Gmea) of a bounded beam appears at a point where a straight line indicating a UE located direction and a bounded beam (0°) cross each other. Meanwhile, since a user equipment is unable to measure bounded beams formed at different steering angles (e.g., 30°, 60°, etc.), a gain of a beam does not appear.

A difference between a gain ($G_{ref}$) of a reference beam and a gain ($G_{mea}$) of a bounded beam is defined as Formula 19.

$$G_{diff}=G_{mea}-G_{ref}\,(\text{dB}) \quad\quad\quad\text{[Formula 19]}$$

According to one embodiment of the present invention, a user equipment transmits feedback information to a base station based on a difference ($G_{diff}$) between a gain ($G_{ref}$) of a reference beam and a gain ($G_{mea}$) of a bounded beam. For instance, the user equipment is able to transmit the difference ($G_{diff}$) to the base station. According to another embodiment of the present invention, a user equipment individually measures a gain ($G_{ref}$) of a reference beam and a gain ($G_{mea}$) of a bounded beam and may be then able to feed back the measured gains simultaneously or separately.

Feedback for Hybrid Beamforming

As mentioned in the foregoing description, a steering angle of a digital beamforming is limited within a range of a bounded beam. Since it is unable to perform an analog beamforming beyond the range of the bounded beam, a range of the digital beamforming is eventually limited to the range of the bounded beam available for the analog beamforming.

Meanwhile, in case of a digital beamforming that can control a steering angle more precisely and easily than an analog beamforming, it is preferable that a digital beam is formed accurately in a UE located direction. For instance, if a straight line indicating a UE located direction is made to match a boresight of a digital beam in FIG. 10, it is preferable to maximize a gain of a hybrid beamforming. Particularly, if a digital beam is formed narrow and sharp, if a steering angle mismatches a UE direction, a gain of a hybrid beamforming may be considerably lowered.

According to one embodiment of the present invention, it is able to estimate a direction of a UE with reference to a base station based on a gain difference between a bounded beam and a reference beam. As mentioned in the foregoing description, if a distance between a UE and a base station is fixed, when a direction of the UE varies by drawing a circle, a gain of a reference beam does not vary. Yet, a gain of a bounded beam varies depending on the direction of the UE. A gain difference between a bounded beam and a reference beam, which is disclosed in Formula 19, varies depending on the direction of the UE as well. Using these properties, it is able to estimate the direction of the UE based on the gain difference between the bounded beam and the reference beam.

Meanwhile, it is difficult to determine an accurate direction of a UE using a gain of a bounded beam only. The reason for this is that combinations of a distance and direction between a base station and a user equipment, having the same gain of a bounded beam, may possibly exist. For instance, a case A (e.g., a direction of a user equipment: 0, a distance between a user equipment and a base station: 10, a steering angle of a bounded beam: 0) and a case B (e.g., a direction of a user equipment: 15, a distance between a user equipment and a base station: 5, a steering angle of a bounded beam: 0) may have the same gain of the bounded beam. It is necessary to normalize a variation of a beam gain appearing in accordance with a distance difference between a base station and a user equipment. For such normalization, according to one embodiment of the present invention, a reference beam can be used.

Since it is able to estimate a UE direction from a gain difference between a reference beam and a bounded beam, a direction of a digital beamforming can be eventually determined through the gain difference between the reference beam and the bounded beam. So to speak, a PMI of the digital beamforming can be determined through the gain difference between the reference beam and the bounded beam.

According to one embodiment of the present invention, for a PMI determination, it is able to use a codebook in which a PMI of a digital beamforming and a gain difference ($G_{diff}$) between a reference beam and a bounded beam are mapped to each other. For instance, a user equipment measures a bounded beam formed by an analog beamforming and feeds back a gain difference ($G_{diff}$) from a reference beam to a base station. From Table 3, the base station selects a PMI or a digital beamforming vector corresponding to the gain difference. Based on the gain difference ($G_{diff}$), the base station can estimate an accurate direction of the user equipment in the bounded beam. Meanwhile, since the base station needs information on a steering angle of the bounded beam, the user equipment can feed back the information on the steering angle of the bounded beam to the base station. For instance, the user equipment can feed back information indicating whether the bounded beam measured by the user equipment is 0° or 30° to the base station. According to another embodiment, in accordance with a timing of a feedback from the user equipment, the base station can obtain information indicating that the corresponding feedback is related to a bounded beam at a prescribed angle. According to another embodiment, the user equipment measures respective steering angles during 360° rotation of the bounded beam, the user equipment respectively calculates gains differences between the measured bounded beams and the reference beams and is then able to feed back the calculated gain differences to the base station. Meanwhile, a specific timing and steering angle for the base station to form a bounded beam are previously defined, broadcasted through a system information, or sent to the user equipment through RRC signaling. On the other hand, information on a steering angle may be included in a signal transmitted through each bounded beam, by which the present invention is non-limited.

Since a base station is able to obtain a UE located direction owing to a feedback of a gain difference ($G_{diff}$), a user equipment may not perform a measurement and feedback for each of an analog beamforming and a digital beamforming separately. And, a hybrid beamforming can be performed with a single measurement and feedback.

Meanwhile, a user equipment directly selects a PMI from Table 3 and may report it to a base station. The PMI may be transmitted to the base station together with a gain difference ($G_{diff}$). Yet, it is not mandatory for the base station to be restricted by the PMI transmitted by the user equipment.

Thus, according to one embodiment of the present invention, it is able to implicitly estimate a PMI for a digital beamforming using a feedback of an analog beamforming only. Through this, a feedback overhead of a user equipment can be reduced and beam control complexity of a base station can be lowered.

Forming Reference Beam Using 2D Array

Although the above-described hybrid beamforming scheme may be performed by 1D array antenna, it can be also performed by 2D array antenna. For instance, it is able to use 2D array antenna for a 3D hybrid beamforming. Using 2D array antenna, it is able to perform a 3D hybrid beamforming in which a beamforming in a horizontal direction and a beamforming in a vertical direction are combined together.

Figure 11:
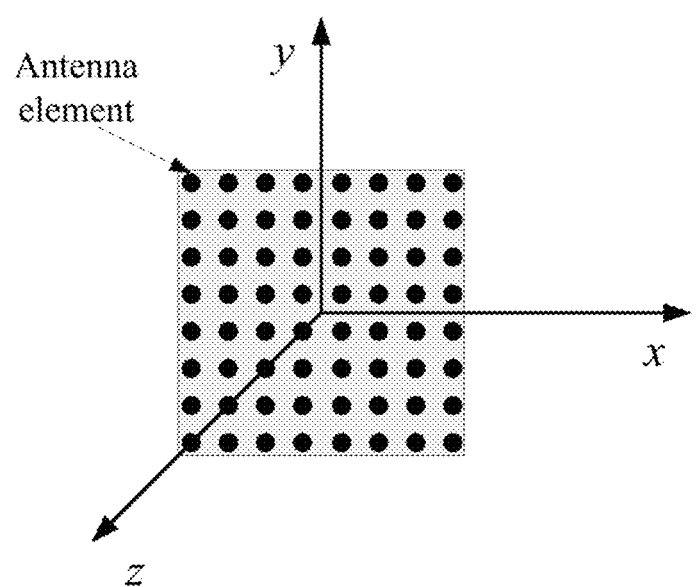
FIG. 11 is a diagram of a 2D array antenna according to one embodiment of the present invention.

In the 2D array antenna, antenna elements are arrayed in horizontal and vertical directions. Various 2D array antennas can be used for a hybrid beamforming. For clarity of the following description, a USA (uniform square array) antenna shall be taken as an example. FIG. 11 is a diagram of a USA antenna according to one embodiment of the present invention. In the USA antenna, a plurality of antenna elements are arrayed at prescribed intervals in a vertical direction and a horizontal direction. According to one embodiment of the present invention, a base station can form a reference beam (e.g., an omni-directional beam, an approximate omni-directional beam, etc.) using the properties of USA.

Figure 12:
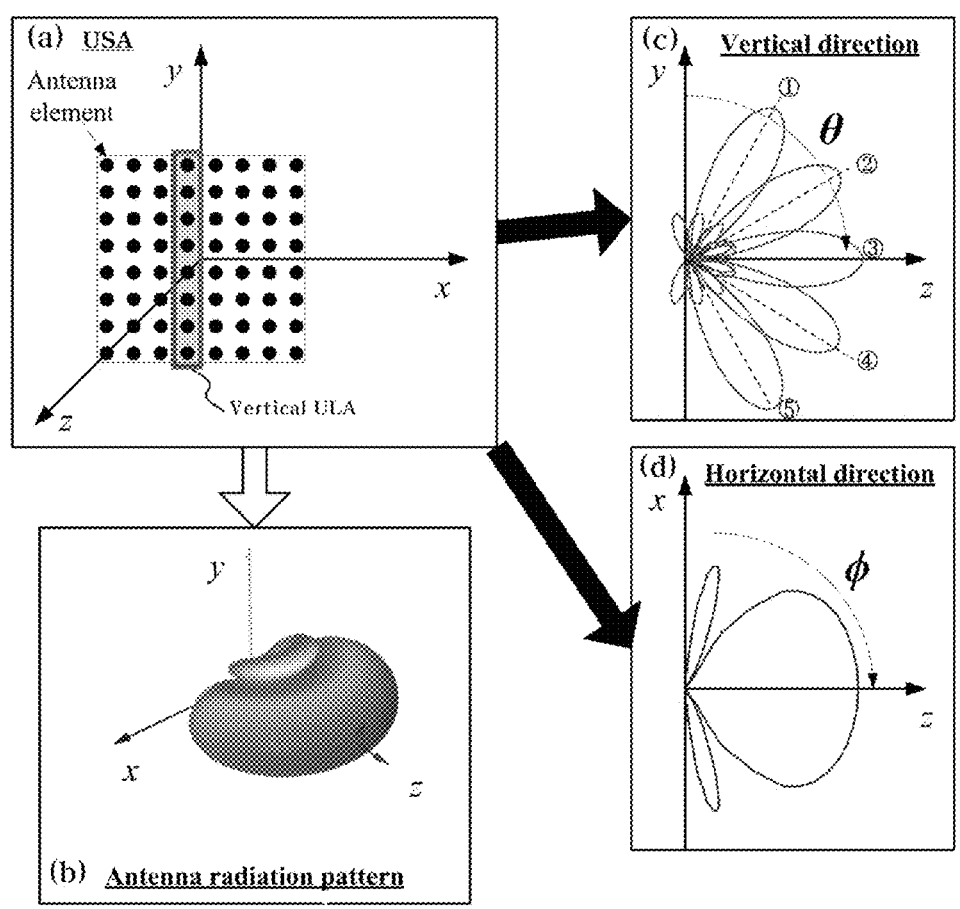
FIG. 12 is a diagram for a method of forming a reference beam according to one embodiment of the present invention.

FIG. 12 is a diagram to describe a method of forming a reference beam according to one embodiment of the present invention. In particular, FIG. 12 (a) shows a 2D USA antenna. FIG. 12 (b) shows a shape of a 3D beam formed through a vertical ULA antenna in the 2D USA antenna shown in FIG. 12 (a). FIG. 12 (c) shows y-z cross-section (i.e., a vertical cross-section) of the 3D beam shown in FIG.

12 (*b*). FIG. 12 (*d*) shows x-z cross-section (i.e., a horizontal cross-section) of the 3D beam shown in FIG. 12 (*b*).

Referring to FIG. 12 (*a*), a plurality of vertical ULA antennas arrayed in a horizontal direction are included in a 2D USA antenna. By arraying 1D arrays including antenna elements, which are arrayed in a first direction, in a second direction, it is able to implement 2D array equivalently. Meanwhile, for a reference beamforming, it is able to use one portion of antenna elements in the USA antenna. For instance, as the antenna elements in a shaded section can be regarded as configuring a single vertical ULA antenna, a reference beam can be formed in a horizontal plane (i.e., x-z plane) through the vertical ULA antenna in the USA antenna.

FIG. 12 (*c*) shows 5 beam cross-sections. In particular, the 5 beam cross-sections indicate the cases of steering a 3D beam in directions ①, ②, ③, ④ and ⑤, respectively. For instance, the 3D beam shown in FIG. 12 (*b*) is initially formed in the direction ① and is then able to move in the directions ②, ③, ④, and ⑤ with the elapse of time. And, the θ indicates a vertical steering angle of the 3D beam. Hence, the 3D beam movement according to time is a process for searching for a beamforming direction optimized for a user equipment, which shall be named a beam training.

In case that a 3D beam is formed using a vertical ULA antenna, a beamforming is performed in the vertical direction. Hence, if a base station transmits a signal by forming a 3D beam in the direction ③, a user equipment located in the direction ① is unable to receive the signal transmitted by the base station or may receive the signal with very low power. On the other hand, a user equipment located in the direction ③ is able to receive the signal with a very high beamforming gain. Hence, the base station should determine the θ in consideration of a location in a vertical direction of a user equipment. And, a training in the vertical direction is performed to determine the θ.

FIG. 12 (*d*) shows a horizontal cross-section (i.e., x-z cross-section) of the 3D beam shown in FIG. 12 (*b*). As a result from performing a beamforming through a vertical ULA antenna, a horizontal cross-section appears as an approximately omni-direction beam unlike a vertical cross-section. In particular, since a beam is distributed at a very wide angle in the x-z plane, a horizontal cross-section of this beam may be used as a reference beam in a horizontal direction. In more particular, in case of using a vertical ULA antenna, a beam is not concentrated in a specific direction but radiates in omni-directions on a horizontal cross-section. Hence, a beam is formed in a circular shape or a fan shape close to the circular shape on a horizontal cross-section. Wherever a user equipment is located in a horizontal direction (e.g., x-z plane), a horizontal beam gain is approximately uniform. Hence, a beam is formed in a horizontal direction in a manner similar to that of forming a beam through omni-directional antenna. Thus, as a reference beam in a horizontal direction is implemented, a user equipment is able to measure a gain of the reference beam in the horizontal direction.

Meanwhile, a base station sequentially forms 3D beams in a vertical direction at a training angle (or a steering angle) θ. A user equipment measures gains of 3D beams formed in vertical directions different from each other, respectively. The 3D beam having the maximum gain among the measured 3D beams can provide the user equipment with the beam cross-section shown in FIG. 12 (*d*). For instance, if the user equipment is located in the direction ② and the 3D beam is formed in the direction ③, the user equipment is unable to experience the beam cross-section shown in FIG. 12 (*d*) in its viewpoint. The reason for this is that the user equipment experiences the cross-section bisected not along the direction ③ but along the direction ② in its viewpoint. In case that the 3D beam is formed in the direction ②, a gain of the beam is maximized and a beam cross-section shown in FIG. 12 (*d*) is provided to the user equipment. Hence, the user equipment is able to determine a gain of a 3D beam having a maximum gain among 3D beams, which are formed by a training, as a gain of a reference beam.

Meanwhile, a gain in a 3D beamforming includes a component of a horizontal (or azimuth directional) beamforming and a component of a vertical (elevation-directional) beamforming. For instance, a gain $G(\varphi,\theta)$ of a 3D beam can be defined, as shown in Formula 20, as a sum of a gain $G_H(\varphi)$ of a horizontal beamforming and a gain $G_V(\theta)$ of a vertical beamforming. In Formula 20, for clarity, a weight of a gain $G_H(\varphi)$ of a horizontal beamforming is assumed as equal to that of a gain $G_V(\theta)$ of a vertical beamforming, by which the present invention is non-limited.

$$G(\varphi,\theta)=G_H(\varphi)+G_V(\theta) \text{ (dB)} \qquad \text{[Formula 20]}$$

When a total gain by a 3D beamforming is defined as Formula 20 and a user equipment is located in a direction β, a gain of a beam (i.e., a reference beam) of a horizontal cross-section formed by a vertical beamforming becomes $G_V(\beta)$. Hence, Formula 19 can be modified into Formula 21.

$$G_{diff}=G_{mea}-G_V(\beta) \text{ (dB)} \qquad \text{[Formula 21]}$$

Thus, a user equipment is able to obtain a gain of a reference beam formed in a horizontal direction. Moreover, the user equipment is able to calculate a gain difference from a bounded beam based on a measured gain of a reference beam. Based on the gain difference, it is able to determine H-PMI (Horizontal-PMI) for a digital beamforming in a horizontal direction.

Meanwhile, in order to improve accuracy of a measured gain of a reference beam, a user equipment is able to measure a gain of a reference beam multiple times. For instance, the user equipment can improve the accuracy by cumulating values measured multiple times during a vertical training interval of a 3D beam like Formula 22.

$$G_v(\theta) = \frac{1}{T}\sum_{t=0}^{T} G_v(\theta, t) \qquad \text{[Formula 22]}$$

In Formula 22, the T may mean a single vertical training interval, by which the present invention is non-limited.

Figure 13:
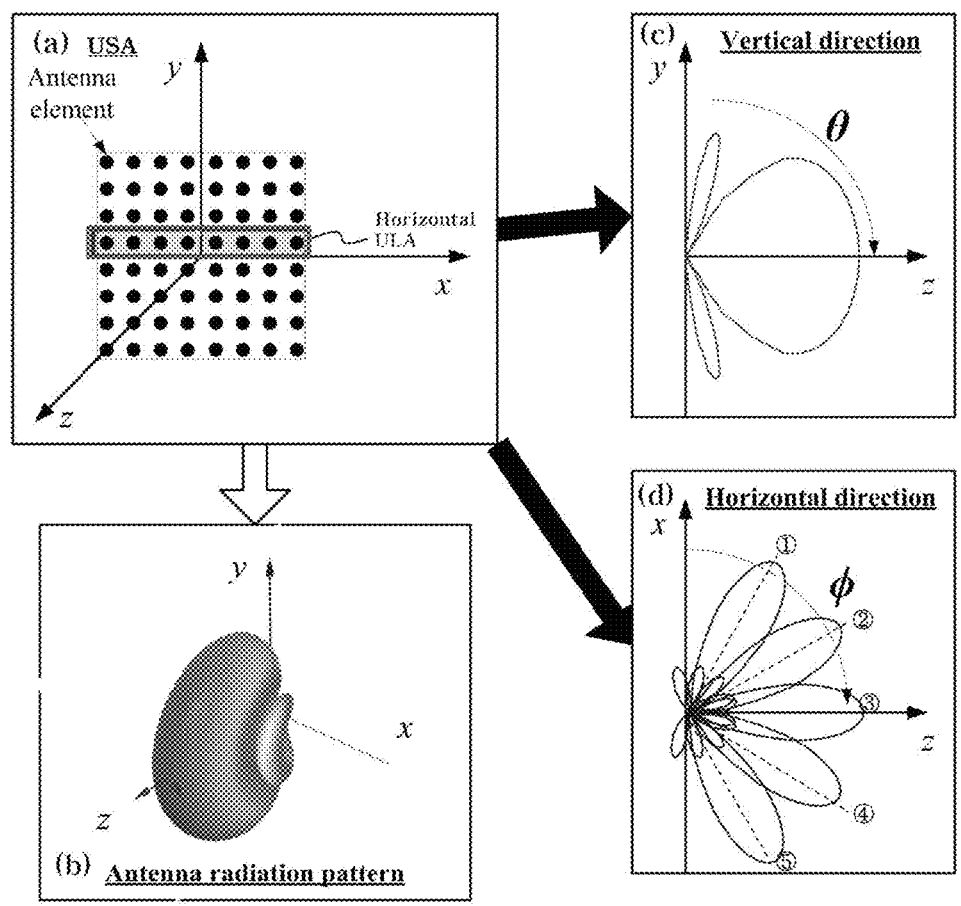
FIG. 13 is a diagram for a method of forming a reference beam according to another embodiment of the present invention.

FIG. 13 is a diagram for a method of forming a reference beam according to another embodiment of the present invention. Details redundant with the foregoing description shall be omitted from the following description.

According to the embodiment shown in FIG. 13, unlike FIG. 12, a 3D beam is formed horizontal ULA antenna. Hence, a reference beam shown in FIG. 13 is formed in the y-z plane.

While a base station is forming a 3D beam in a horizontal direction Φ, a user equipment measures a vertical reference beam form on a vertical cross-section through the 3D beam. In order to perform a beamforming in the horizontal direction Φ, it is able to use a horizontal ULA antenna in the USA antenna. As a result, a 3D beam shown in FIG. 13 (*b*) is formed. In this case, since the formed 3D beam irradiates on the vertical cross-section instead of being concentrated in one direction, a vertical reference beam in an approximately circular shape or a fan shape close to a circle is formed on the vertical cross-section.

As a maximum gain of the vertical reference beam becomes $G_H(\varphi)$, Formula 19 can be modified into Formula 23.

$$G_{diff} = G_{mea} - G_H(\varphi) \text{ (dB)} \quad \text{[Formula 23]}$$

A user equipment measures a gain of a vertical reference beam and then feeds back a gain difference from a bounded beam formed in a vertical direction to a base station. Based on the gain difference, the base station can determine V-PMI (Vertical-PMI) for a vertical digital beamforming.

Moreover, in order to measure an accurate gain of a reference beam, the user equipment can cumulatively measure a gain of a beam during a horizontal training interval of a 3D beam like Formula 24.

$$G_H(\phi) = \frac{1}{T} \sum_{t=0}^{T} G_H(\phi, t) \quad \text{[Formula 24]}$$

Subset of 2D Array Antenna for Forming Reference Beam

As mentioned in the foregoing description, a reference beam can be formed through vertical or horizontal ULA antenna in 2D USA antenna. More generally, elements of a subset among a plurality of antenna elements included in the whole 2D array antenna can be used to form a reference beam. Meanwhile, reference beams are formed over several times in accordance with a training of a beam. In doing so, all the reference beams are formed through a single subset. Alternatively, the reference beams may be formed through different subsets, respectively.

According to one embodiment, horizontal reference beams can be formed through a single subset. For instance, a first reference beam, a second reference beam and a third reference beam can be sequentially formed through a first subset, a second subset and a third subset, respectively. The first subset may include a vertical ULA antenna, by which the present invention is non-limited.

Figure 14:
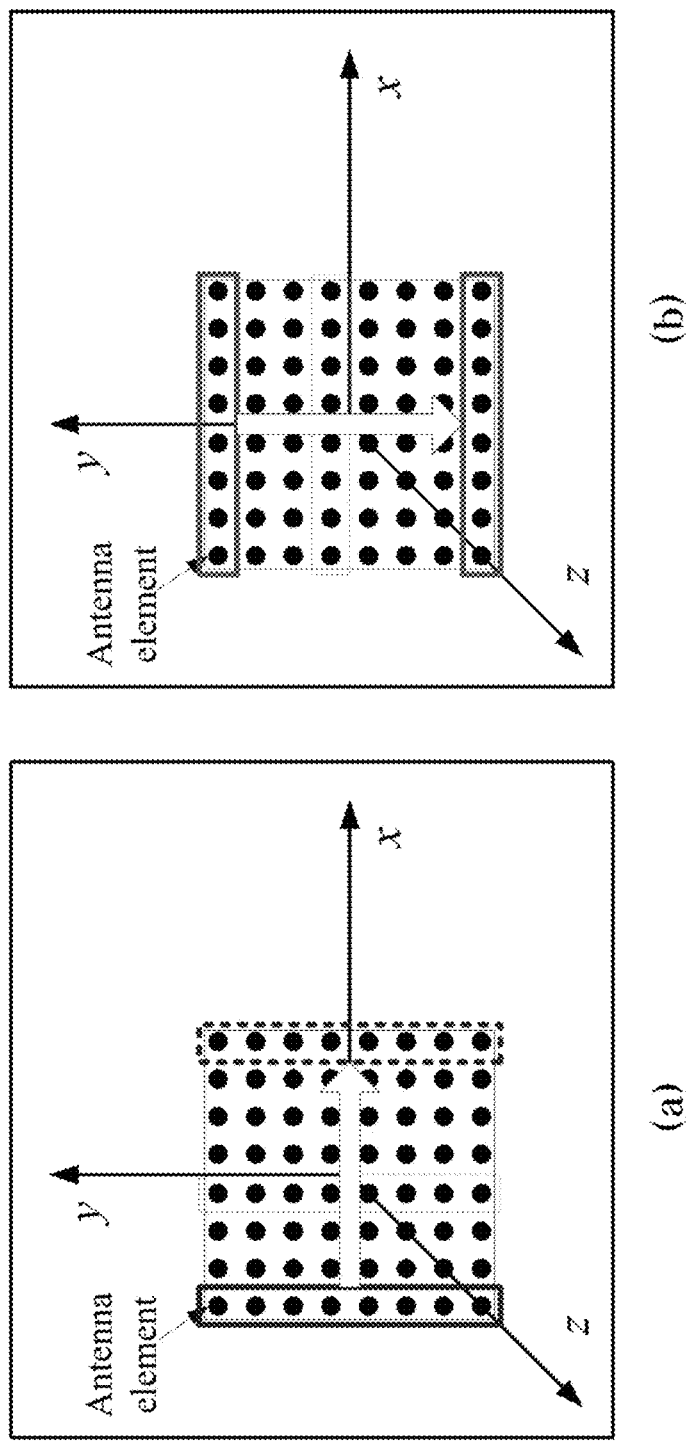
FIG. 14 is a diagram for a method of forming a reference beam according to further embodiment of the present invention.

According to another embodiment, horizontal reference beams can be formed through different subsets, respectively. For instance, referring to FIG. 14 (a), a first reference beam, a second reference beam and a third reference beam can be sequentially formed through a first subset, a second subset and a third subset, respectively.

According to another embodiment, horizontal reference beams can be formed through different subsets and different V-PMIs, respectively. For instance, a first reference beam, a second reference beam and a third reference beam can be sequentially formed through a first subset & a first V-PMI, a second subset & a second V-PMI and a third subset & a third V-PMI, respectively. In this case, V-PMI is provided for a vertical digital beamforming. The first to third V-PMIs may correspond to weight matrixes for performing a digital beamforming in different directions, respectively.

According to another embodiment, vertical reference beams can be formed through a single subset, respectively. For instance, referring to FIG. 14 (a), a first reference beam, a second reference beam and a third reference beam can be sequentially formed through a first subset, respectively. In this case, the first subset may include a horizontal ULA antenna, by which the present invention is non-limited.

According to another embodiment, vertical reference beams can be formed through different subsets, respectively. For instance, referring to FIG. 14 (b), a first reference beam, a second reference beam and a third reference beam can be sequentially formed through a first subset, a second subset and a third subset, respectively.

According to further embodiment, vertical reference beams can be formed through different subsets and different H-PMIs, respectively. For instance, a first reference beam, a second reference beam and a third reference beam can be sequentially formed through a first subset & a first H-PMI, a second subset & a second H-PMI and a third subset & a third H-PMI, respectively. In this case, H-PMI is provided for a horizontal digital beamforming. The first to third H-PMIs may correspond to weight matrixes for performing a digital beamforming in different directions, respectively.

Meanwhile, it is not necessary for an applicable scope of the embodiments mentioned in the foregoing description to be limited to a hybrid beamforming. For instance, in a configuration that an analog beamforming stage is replaced by a digital beamforming stage, the present embodiments are applicable. A digital beamforming may be performed sequentially and serially on each antenna subgroup through an antenna subgrouping. Thus, the present embodiments are applicable in a digital beamforming scheme having this hierarchical structure.

For clarity, the foregoing description is made with reference to a downlink, by which the present invention is non-limited. The present embodiments are applicable to various combinations of transmitters and receivers. For instance, the present embodiments are applicable to an uplink transmission scenario for a user equipment-to-base station transmission, an inter-user equipment (e.g., D2D, V2V, etc.) signal transmission scenario, an inter-base station (e.g., relay, wireless backhaul, etc.) signal transmission scenario and the like.

Figure 15:
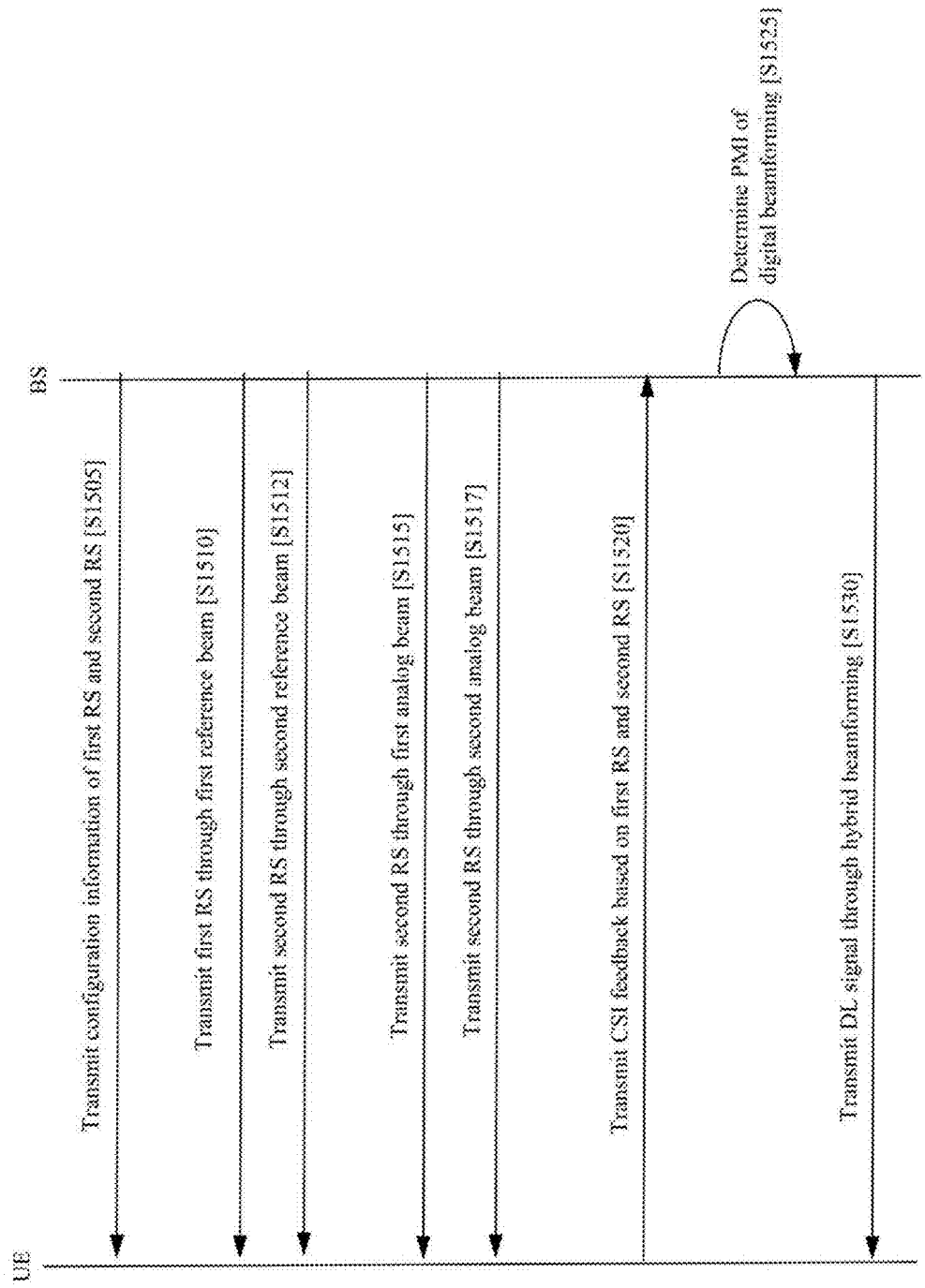
FIG. 15 is a diagram of a method of transmitting a reference signal for a hybrid beamforming according to one embodiment of the present invention.

FIG. 15 is a diagram for a method of transmitting a reference signal for a hybrid beamforming according to one embodiment of the present invention. Details redundant with the foregoing description shall be omitted from the following description.

Referring to FIG. 15, a base station transmits configuration informations of a first reference signal and a second reference signal to a user equipment [S1505]. In particular, the first reference signal may include a reference signal transmitted through a reference beam and the second reference signal may include a reference signal transmitted through a bounded beam. A transmission timing (e.g., period, subframe number, etc.) of a signal, information on a pattern having a signal mapped to a time-frequency resource element, information on an antenna port for transmitting a signal and the like may be included in the configuration information of the reference signal, by which the present invention is non-limited.

The base station transmits the first reference signal through a first reference beam [S1510]. For instance, the base station selects first subset elements arrayed in a first direction from a plurality of antenna elements included in a 2D array antenna. The base station transmits the first reference signal through a reference beam formed by the first subset elements. A first cross-section of the first reference beam for the first direction may correspond to a directional beam, while a second cross-section of the first reference beam for a second direction crossing the first direction may correspond to an omni-directional beam.

The base station transmits the second reference signal through a second reference beam [S1512]. For instance, the base station forms the second reference beam by steering the first reference beam along the first direction. The second reference beam may be formed by the first subset elements or second subset elements arrayed in the first direction. A PMI (precoding matrix index) of the second reference beam may be different from that of the first reference beam.

The base station transmits the second reference signal through a first analog beam [S1515]. For instance, the base station transmits the second reference signal through an analog beam formed through the first subset elements or the second subset elements. The analog beam may include a bounded beam indicating an angle range for enabling a hybrid beamforming to be performed along a second direction.

The base station transmits the second reference signal through a second analog beam [S1517]. In this case, the second analog beam may be formed by moving the first analog beam along the second direction.

Based on the first reference signal and the second reference signal, the user equipment transmits channel state information (CSI) [S1520]. The CSI may include a gain difference between at least one reference beam and at least one analog beam.

Based on the gain difference between the reference and analog beams included in the CSI, the base station determines a PMI of a digital beamforming [S1525].

The base station transmits a downlink signal through the hybrid beamforming having the analog beamforming and the digital beamforming combined therein [S1530].

Meanwhile, one of the first direction and the second direction may include a horizontal direction and the other may include a vertical direction.

Figure 16:
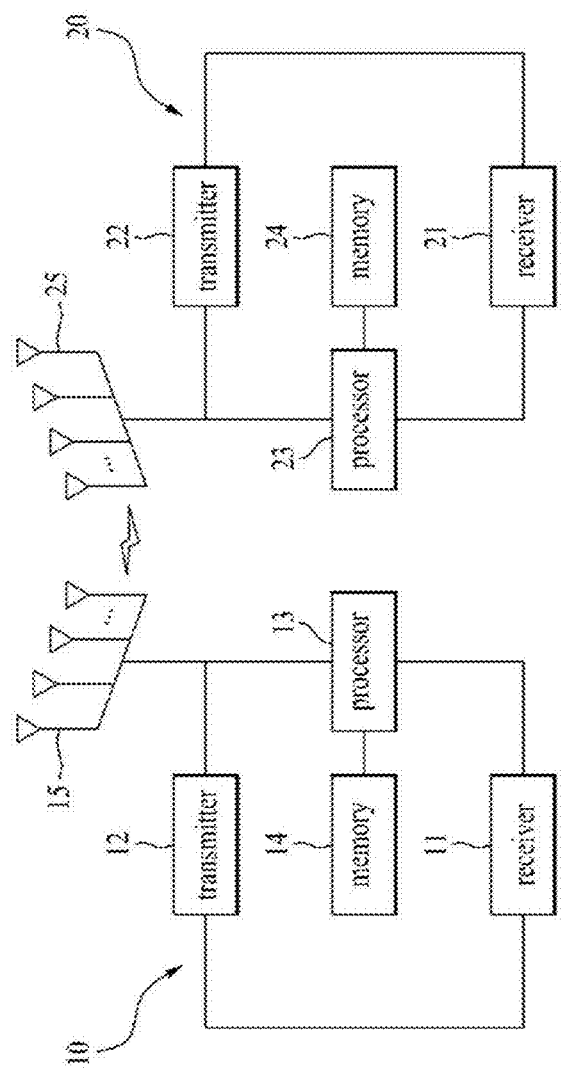
FIG. 16 is a diagram of a base station and a user equipment according to one embodiment of the present invention.

FIG. 16 is a diagram of a configuration of a base station and a user equipment according to one embodiment of the present invention. A base station 10 and a user equipment 20 shown in FIG. 16 can perform the methods mentioned in the foregoing description and redundant details shall be omitted from the following description.

Referring to FIG. 16, a base station 10 may include a receiver 11, a transmitter 12, a processor 13, a memory 14 and a plurality of antennas 15. In this case, a plurality of the antennas 15 may mean a base station supportive of MIMO transmission and reception. The receiver 11 may receive various signals, data and information in uplink from a user equipment. The transmitter 12 may transmit various signals, data and information in downlink to a user equipment. And, the processor 13 may control overall operations of the base station 10.

And, the processor 13 of the base station 10 may perform a function of operating and processing information received by the base station 10, information to be externally transmitted and the like. The memory 14 can store the operated and processed information and the like for a prescribed time and may be substituted with such a component as a buffer (not shown in the drawing) or the like.

According to one embodiment, a plurality of the antennas 15 may include a 2D array antenna. The processor 13 selects first subset elements arrayed in a first direction from a plurality of antenna elements included in the 2D array antenna of the base station. The transmitter 12 transmits a first reference signal through a reference beam formed by the first subset elements. A first cross-section for the first direction of the reference beam may correspond to a directional beam and a second cross-section of the reference beam for the second direction may correspond to an omni-directional beam.

A user equipment 20 may include a receiver 21, a transmitter 22, a processor 23, a memory 24 and a plurality of antennas 25. In this case, a plurality of the antennas 25 may mean a user equipment supportive of MIMO transmission and reception. The receiver 21 may receive various signals, data and information in downlink from a base station. The transmitter 22 may transmit various signals, data and information in uplink to a base station. And, the processor 23 may control overall operations of the user equipment 20.

And, the processor 23 of the user equipment 20 may perform a function of operating and processing information received by the user equipment 20, information to be externally transmitted and the like. The memory 24 can store the operated and processed information and the like for a prescribed time and may be substituted with such a component as a buffer (not shown in the drawing) or the like.

According to one embodiment, the receiver 21 receives the first reference signal through the first subset elements arrayed in the first direction among a plurality of the antenna elements included in the 2D array antenna of the base station. The processor 23 respectively measures a gain of a reference beam formed by the first subset elements based on the first reference signal. A first cross-section for the first direction of the reference beam may correspond to a directional beam and a second cross-section of the reference beam for a second direction crossing the first direction may correspond to an omni-directional beam.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

The invention claimed is:

1. A method of transmitting a reference signal for a hybrid beamforming by a base station in a wireless communication system, the method comprising:
   selecting first subset elements arrayed in a first direction from a plurality of antenna elements included in a 2-dimensional (2D) array antenna of the base station; and
   transmitting a first reference signal through a reference beam formed by the first subset elements,
   wherein a first cross-section for the first direction of the reference beam corresponds to a directional beam and
   wherein a second cross-section for a second direction crossing the first direction of the reference beam corresponds to an omni-directional beam.

2. The method of claim 1, further comprising:
   transmitting a second reference signal through an analog beam formed through either the first subset elements or second subset elements; and
   receiving a channel state information (CSI) including a gain difference between the reference beam and the analog beam.

3. The method of claim 2, further comprising performing a hybrid beamforming in which an analog beamforming and a digital beamforming are coupled, based on the CSI,
   wherein a precoding matrix index (PMI) of the digital beamforming is determined based on the gain difference between the reference beam and the analog beam.

4. The method of claim 2, wherein the analog beam indicates an angle range where performing the hybrid beamforming along the second direction is possible.

5. The method of claim 1, wherein the transmission of the first reference signal comprises:
   forming a first reference beam through the first subset elements; and
   forming a second reference beam by steering the first reference beam along the first direction,
   wherein the second reference beam is formed by either the first subset elements or second subset elements arrayed in the first direction.

6. The method of claim 5, wherein a precoding matrix (PMI) of the second reference beam is different from a PMI of the first reference beam.

7. The method of claim 1, wherein one of the first direction and the second direction is a horizontal direction and the other is a vertical direction.

8. A method of receiving a reference signal for a hybrid beamforming by a user equipment in a wireless communication system, the method comprising:
   receiving a first reference signal through first subset elements arrayed in a first direction among a plurality of antenna elements included in a 2-dimensional (2D) array antenna of a base station; and
   measuring a gain of a reference beam formed by the first subset elements based on the received first reference signal,
   wherein a first cross-section for the first direction of the reference beam corresponds to a directional beam and
   wherein a second cross-section for a second direction crossing the first direction of the reference beam corresponds to an omni-directional beam.

9. The method of claim 8, further comprising:
   receiving a second reference signal through an analog beam formed through either the first subset elements or second subset elements; and
   transmitting a channel state information (CSI) including a gain difference between the reference beam and the analog beam.

10. The method of claim 9, further comprising receiving downlink data through a hybrid beamforming in which an analog beamforming and a digital beamforming are coupled,
    wherein a precoding matrix index (PMI) of the digital beamforming is determined based on the gain difference between the reference beam and the analog beam.

11. The method of claim 9, wherein the analog beam indicates an angle range where performing the hybrid beamforming along the second direction is possible.

12. The method of claim 8, further comprising:
    receiving the first reference signal through third subset elements arrayed in the first direction;
    measuring a gain of a reference beam formed by the third subset elements based on the first reference signal received through the third subset elements; and
    averaging a gain of the reference beam formed by the first subset elements and a gain of the reference beam formed by the third subset elements.

13. The method of claim 12, wherein a precoding matrix (PMI) of the reference beam formed by the first subset elements is different from a PMI of the reference beam formed by the third subset elements.

14. The method of claim 8, wherein one of the first direction and the second direction is a horizontal direction and the other is a vertical direction.

15. A base station of transmitting a reference signal for a hybrid beamforming in a wireless communication system, the base station comprising:
    a processor for selecting first subset elements arrayed in a first direction from a plurality of antenna elements included in a 2D array antenna of the base station; and
    a transmitter for transmitting a first reference signal through a reference beam formed by the first subset elements,
    wherein a first cross-section for the first direction of the reference beam corresponds to a directional beam and
    wherein a second cross-section for a second direction crossing the first direction of the reference beam corresponds to an omni-directional beam.

16. A user equipment of receiving a reference signal for a hybrid beamforming in a wireless communication system, the user equipment comprising:
    a receiver for receiving a first reference signal through first subset elements arrayed in a first direction among a plurality of antenna elements included in a 2D array antenna of a base station; and
    a processor for measuring a gain of a reference beam formed by the first subset elements based on the received first reference signal,
    wherein a first cross-section for the first direction of the reference beam corresponds to a directional beam and
    wherein a second cross-section for a second direction crossing the first direction of the reference beam corresponds to an omni-directional beam.

* * * * *